United States Patent [19]
Ogata

[11] Patent Number: 4,796,092
[45] Date of Patent: Jan. 3, 1989

[54] IMAGE PROCESSING WITH COMPRESSION ENCODING

[75] Inventor: Yukihiko Ogata, Kawasaki, Japan

[73] Assignee: Canon Kabushiki Kaisha, Tokyo, Japan

[21] Appl. No.: 716,707

[22] Filed: Mar. 27, 1985

[30] Foreign Application Priority Data

Apr. 3, 1984 [JP] Japan .................................. 59-65075

[51] Int. Cl.⁴ .............................................. H04N 1/40
[52] U.S. Cl. ................................................ 358/261.1
[58] Field of Search ...................... 358/260, 261, 262; 340/347 AD

[56] References Cited

U.S. PATENT DOCUMENTS

| | | | |
|---|---|---|---|
| 4,028,731 | 6/1977 | Arps et al. | 358/261 |
| 4,204,232 | 5/1980 | Mizuiyo | 358/261 |
| 4,542,413 | 9/1985 | Rallapalli | 358/261 |

Primary Examiner—Edward L. Coles, Sr.
Attorney, Agent, or Firm—Fitzpatrick, Cella, Harper & Scinto

[57] ABSTRACT

An image processing method comprising the step of converting a read image signal into an intermediate code which is then stored in an image memory. The method further includes the steps of reading out the stored intermediate code and converting the pixel density of the read-out intermediate code. Then, the intermediate code, the pixel density of which has been converted, is converted into a final code.

13 Claims, 4 Drawing Sheets

IMAGE PROCESSING WITH COMPRESSION ENCODING

BACKGROUND OF THE INVENTION

1. Field of the Invention

The present invention relates to an image processing method in which memory means to store image data is used, and more particularly to an image processing method applicable to apparatus, such as facsimile devices, which electrically transmit image data.

1. Description of the Prior Art

An electrical image transmission system in a facsimile device with a high-density image reader has a structure such as shown in FIG. 1.

That is, in FIG. 1, reference numeral 1 denotes a high-density image reader which reads an image on an original document. The run-length of the read image is determined by a run-length counter 2. An MR (modified read) encoder 3 converts the determined run-length into a corresponding MR code which is then stored in an image memory 4.

A high-density and image contains many image data which require a memory of large capacity to be stored in.

In view of this, before delivering data to a transmitter 5, the transmission system compresses image data using a compression system for use in electrical transmission applications and stores the compressed data in a memory of a relatively small capacity.

As this image compression system, a two-dimensional compression code system which includes a MR (modified read) system, a modified MR (MMR) system or the like has been employed in accordance with CCITT's recommendation.

When image data are compressed and stored in a memory by means of such a system, however, it is impossible to directly change the density of pixels from image codes themselves in a line because the MR or MMR system is a two-dimensional compression system which compresses data on the basis of the data in the preceding line.

It is therefore extremely difficult to change the density of image data compressed and stored in the memory by the above-mentioned compression system directly before or during communication.

This causes a problem when the image data stored in the memory are transmitted to a plurality of called parties (receivers). For example, if the stored image data are for a B4 size and a receiver can only record a B5 sized image, transmission of the data for the B4 sized image to this receiver is impossible. In other words, no transmission has been possible to any receivers other than a receiver which can record a B4 sized image.

SUMMARY OF THE INVENTION

It is an object of the present invention to eliminate the drawbacks of the prior art mentioned above.

It is another object of the present invention to provide an image processing method which enables transmission to any receivers regardless of the recording ability of the receivers.

It is still another object of the present invention to provide an image processing method which enables outputting of various sized image data in spite of the size of image data in a memory.

It is still another object of the present invention to provide an image processing method which enables changing the density of high-density image data temporarily stored in a memory directly before or during communication.

According to the present invention, the foregoing objects are attained by coding an image signal, for example using run length coding, to produce a first code signal, which is stored in an image memory. The code signal is then read out from the image memory, and may if desired be appropriately processed, for example by a density conversion performed in accordance with a density-recording capability of the intended receiver. After any such processing, the code signal is then converted a second time to a second code signal, for transmission. The second code conversion may also take the form of a run length encoding. If desired, the first coding can use a one-dimensional principle and the second a two-dimensional principle.

Other objects of the present invention will be apparent from the following detailed description and the accompanying drawings of preferred embodiments of the present invention.

DETAILED DESCRPTION OF THE PREFERRED EMBODIMENTS

Figure 1:
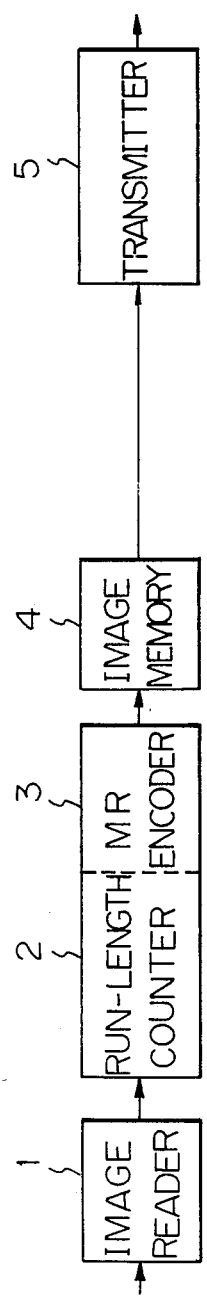
FIG. 1 is a block diagram of a prior art system.

The system of the present invention will be described in more detail with respect to the embodiments thereof shown in the drawings.

Figure 2:
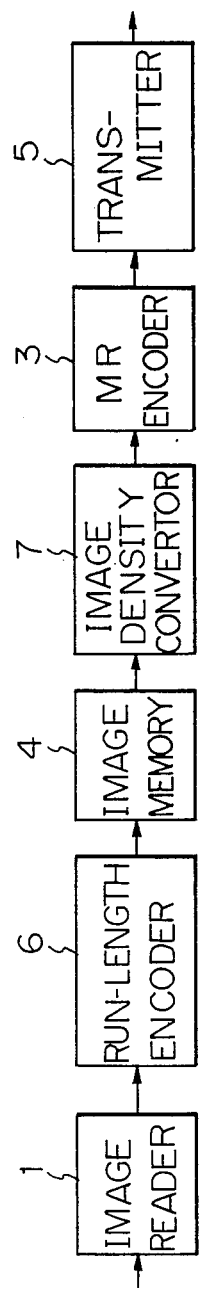
FIG. 2 is a block diagram of an embodiment of the present invention.

FIG. 2 illustrates an embodiment of the present invention. In the figure, the same parts shown in FIG. 1 are given as the same reference numerals and the description thereof is omitted accordingly.

In the particular embodiment, the image data read by an image reader 1 is converted by a run-length encoder 6 into a run-length (RL) code. The RL code is then stored in an image memory 4.

The RL code includes the numeralization of the length of a continuous white (white run) and the length of a continuous black (black run) of image data and is compressed considerably compared with actual live image data.

The RL code is an intermediate code which is produced in the course of conversion of data to an MR code and an MMR code.

The intermediate RL code is then stored in the image memory 4.

On the other hand, in transmission, the RL code read out from the memory 4 is inputted to an image density converter 7.

Conversion of the pixel density is performed both by conversion of the length of an RL code in the main scanning direction and by a conversion which includes thinning out of scan lines in the sub-scanning direction.

Since the RL code is an intermediate code which is the numeralization of white and black runs, it can be compressed by a simple operation. That is, if an image of the same size as read is recorded on the reception side, high-minute high-density image data can be converted into less-minute less-density image data. In addition, if an image of the same density as read is record on the reception side, the size of the image can be converted.

For example, if the number of RL codes read from the image memory 4 is decreased to a half, data result which are twice as coarse as the original image data.

Figure 3:
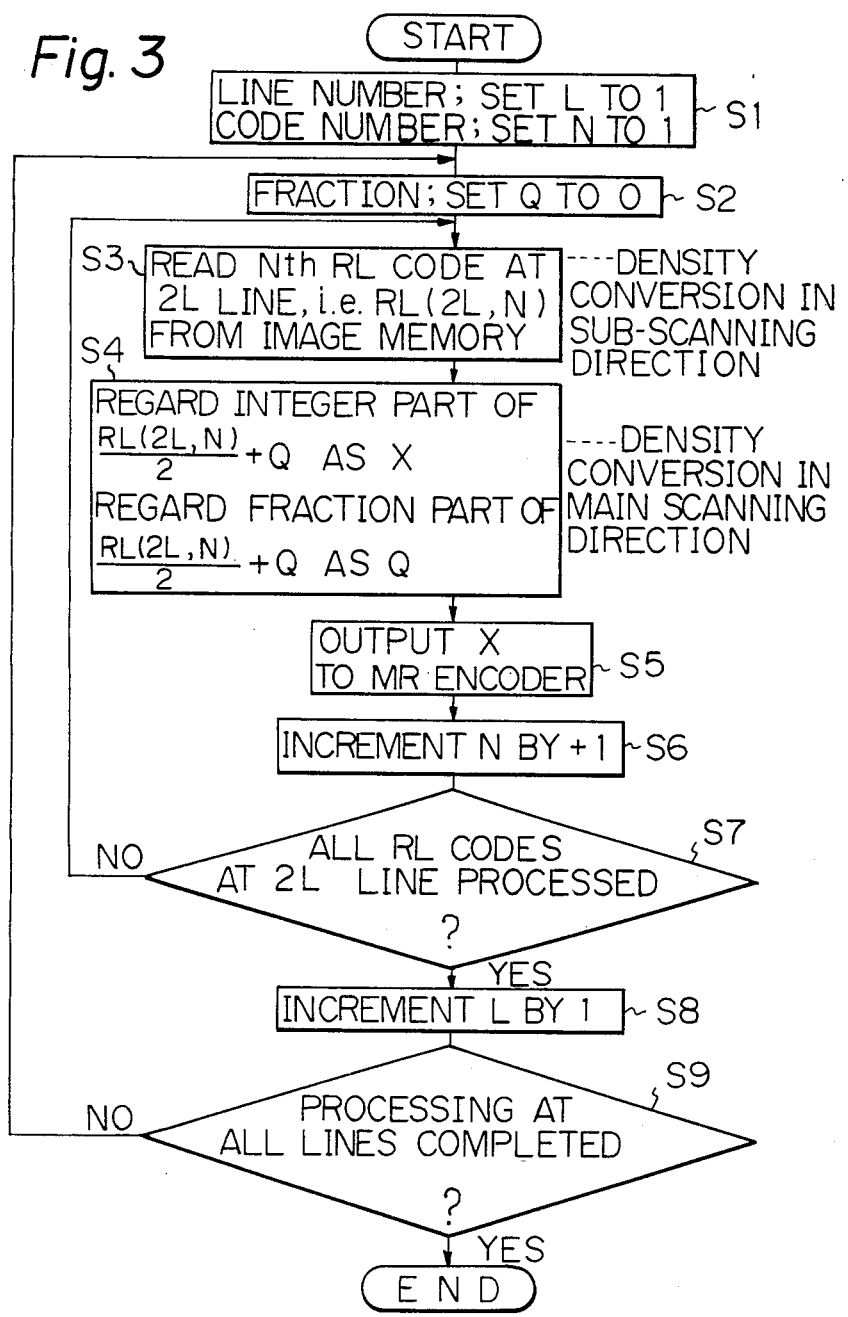
FIG. 3 is a flowchart of the operation of a pixel density converter.

FIG. 3 illustrates means for control of the image density converter 7 performed to convert the image density both in the main scanning and sub-scanning directions into corresponding half values.

That is, in FIG. 3, when control starts, initialization is performed at a step S1 where the line number L is set to 1 and the code number N is set to 1. At a step S2, a fraction Q of the code is set to 1.

Control advances to a step S3 where the Nth RL code in the 2Lth line, i.e., the (2L, N) RL code, is read from the image memory. At this step, density conversion in the sub-scanning direction is performed.

Then, control advances to a step S4 where the integer part of RL (2L, N)/2+Q is regarded as X and the fraction part of RL (2L, N)/2+Q is regarded as Q. At this step, density conversion in the main scanning direction is performed.

Control then advances to a step S5 where the X is outputted to the RM encoder 3 of FIG. 2 in which the X is converted into a corresponding MR code and is then delivered to the transmitter 5.

Control now advances to a step S6 where N is increased by one. At a step S7, it is determined whether or not all the RL codes in the 2Lth line have been processed. If the RL codes have not all been processed, control returns to the step S3. If all the RL codes have been processed, L is increased by one at a step S8. Then, control advances to a step S9.

At this step S9, it is determined whether or not processing of the RL codes in all lines has been completed. If the processing is not completed, control returns to the step S3 to repeat the above-mentioned processing.

When processing of the codes in all the lines has been completed, control of the image density converter 7 is completed.

In the above embodiment, the electrical image transmission system using the MR codes has been described. However, the present invention is also applicable to electrical image transmission systems using other image compression systems in which RL codes are used as an intermediate code to MH (Modified Huffman) codes or MMR codes.

As described above, the present invention employs a system which converts high-density image data into a corresponding run-length code, stores the run-length code in a memory, reads the code from the memory and converts the density of the code as it is. Thus, the present invention has the highly useful property of the pixel density being convertible directly before or during communication.

Figure 4:
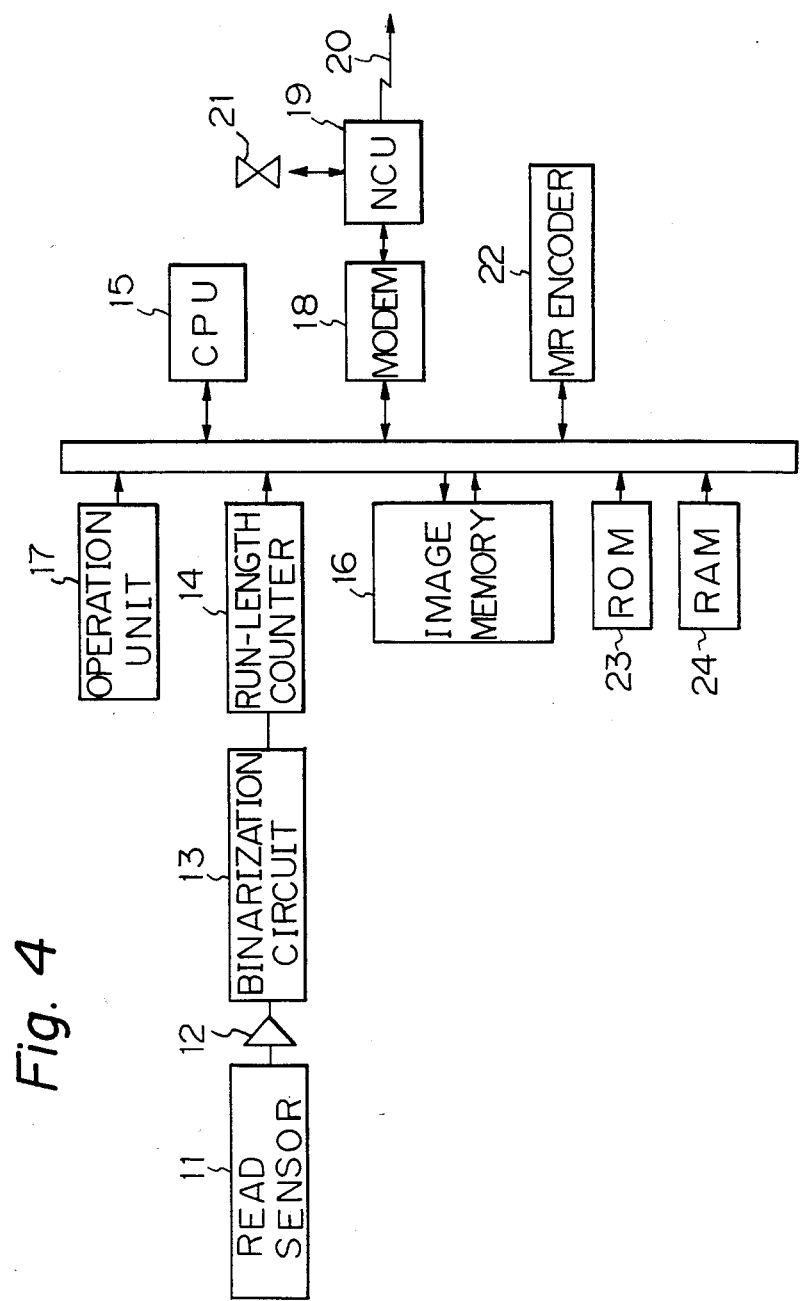
FIG. 4 is a block diagram of another embodiment of the present invention.

FIG. 4 is a block diagram of the circuit of an image transmission apparatus which is another embodiment of the present invention.

In the figure, reference numeral 11 denotes a read sensor which reads an image on an original document. Reference numeral 12 denotes an amplifier which amplifies the output of the sensor 11. Reference numeral 13 denotes a binarization circuit which binarizes the output of the amplifier 12 with respect to a predetermined threshold level. Reference numeral 14 denotes a run-length counter which counts the run-length of the image. Reference numeral 15 denotes a CPU which controls the whole system. Reference numeral 16 denotes an image memory which stores the output of the run-length counter 14 and which is composed of a random access memory. Reference numeral 17 denotes an operation unit to which a transmission instruction, etc., are inputted. Reference numeral 18 denotes a modem which modulates data to be transmitted and demodulates a received signal. Reference numeral 19 denotes a network control unit (referred to as NCU hereinafter) which controls connection of a telephone line 20 to a telephone 21 or the modem 18. Reference numeral 22 denotes an MR encoder which converts a run-length code into a corresponding MR code. Reference numeral 23 denotes a ROM (Read Only Memory) which stores a program processed by the CPU 15. Reference numeral 24 denotes a ROM (Random Access Memory) which temporarily stores data necessary for the processing by the CPU 15.

Figure 5:
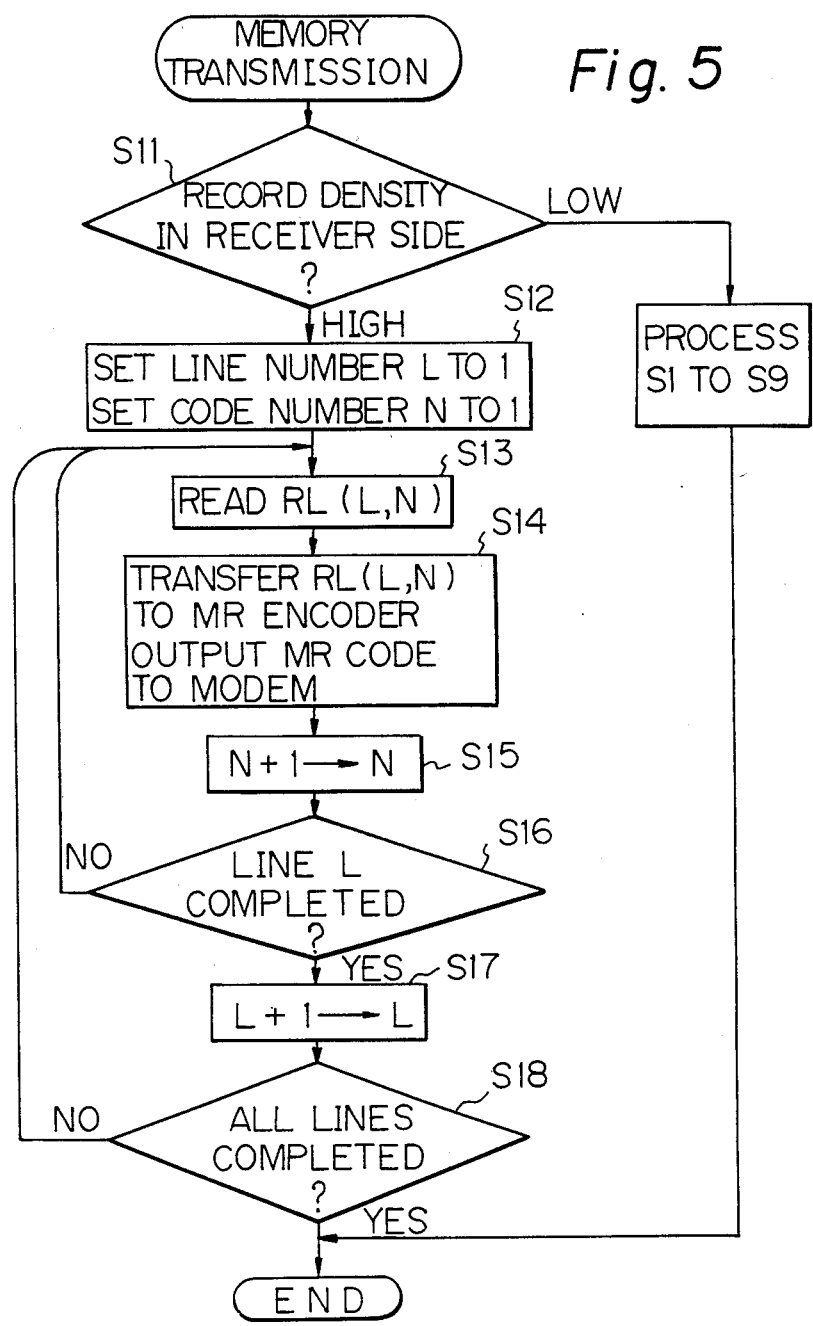
FIG. 5 is a flowchart of the operation of the embodiment shown in FIG. 4.

A memory transmission operation when image data corresponding to one page is already stored in the form of a run-length code in the image memory 16 will be described with respect to a control flowchart of FIG. 5. A program for execution of the flowchart of FIG. 5 is stored in the ROM 23.

First, at a step S11, the density of recorded data on the reception side is checked. The density of the recorded data is transmitted from the reception side during execution of the previous process of communication.

The data is always stored in the image memory in a high-minute mode. Thus, if the reception side is of less-minute mode, processing of steps similar to the steps S1-S9 of the control flowchart of FIG. 3, will be performed. That is, in the sub-scanning direction, data in the main scan lines are thinned out in every other line. On the other hand, in the main scanning direction, the length of a run-length code is shortened by a half, and is then converted into a corresponding MR code for electrical transmission.

On the other hand, if the record mode of the reception if of high-minute mode, processing of steps S12-S18 is performed. In the step S12, the line number L and the code number N are set to 1 as in a manner similar to the step S1.

At the step S13, the run-length code RL (L, N) in the image memory specified at the address (L, N) is read out. The read RL (L, N) is outputted to the MR encoder 22. The MR encoded data are outputted to the modem 18. The MR codes are transmitted to the receiver via the NCU 19 and a line 20. At the step S15, the data N is incremented. Until MR encoding and the subsequent transmission of the MR codes in one line are completed, the operation of the steps S13-S16 is repeated. When the processing for the line is completed, control advances to processing for the next line. When processing for all the lines is completed, the whole operation of the system is also completed.

As described above, regardless of the density of recorded data on the reception side, data can be stored always in the same format of codes in the image memory. In addition, since data is stored in the image memory in the form of an intermediate code such as a run-length code or in the form of compressed data for each line, conversion of image density is easy, so that high-speed output processing is attained, and that the capacity of the image memory can be reduced as compared with that of an image memory used for storage of actual image data. Furthermore, since data is stored in the form of an intermediate code, the particular method is applicable to various receivers.

The present invention, therefore, has a great advantage over the prior art.

It is noted that various modifications can be made in the spirit and scope of the present invention in addition to the embodiments described above.

What I claim is:

1. An image processing method comprising the steps of:
    obtaining an original image signal;
    performing a compression encoding of the original image signal according to a run length of the original image signal to obtain a first code signal;
    storing the first code signal in an image memory;
    converting a run length of the first code signal read out of the image memory;
    performing a compression encoding according to the run length converted in said converting step to obtain a second code signal; and
    transmitting the second code signal.

2. An image processing method according to claim 1, wherein the first code signal includes a one-dimensional compression code signal and the second code signal includes a two-dimensional compression code signal.

3. An image processing method according to claim 2, wherein the first code signal includes a run length code signal and the second code signal includes a modified READ (MR) code signal.

4. An image processing method comprising the steps of:
    obtaining an original image signal;
    compressing and encoding the original image signal to obtain a first code signal representing a run length of the original image signal;
    storing the first code signal in an image memory;
    discriminating a recording mode on a reception side, in response to information from the reception side;
    converting the first code signal read out of the image memory, according to the discriminated recording mode;
    encoding the converted first code signal into a second code signal having a form which is different from a form of the first code signal; and
    transmitting the second code signal to the reception side.

5. An image processing method according to claim 4, wherein in said converting step the run length is converted in accordance with the recording mode.

6. An image processing method according to claim 4, wherein the first code signal includes a one-dimensional compression code signal and the second code signal includes a two-dimensional compression code signal.

7. An image processing method according to claim 6, wherein the first code signal includes a run length code signal and the second code signal includes a modified READ (MR) code signal.

8. An image processing method according to claim 4, wherein the operation in said converting step is inhibited in accordance with the recording mode.

9. An image processing method according to claim 4, wherein the recording mode includesa mode referring to a recording resolution.

10. An image processing method in which original image data is stored in an image memory and then the stored image data in the image memory is read out to be transmitted, said method comprising the steps of:
    obtaining the original image data;
    compression encoding the original image data into first code data capable of converting a resolution of the image data;
    storing the first code data into the image memory;
    converting the first code data read out of the image memory into a predetermined-ratio run length without restoring so as to convert the resolution of the image data; and
    further compression encoding the first code data conerted in said resolution converting step, into second code data, to transmit the second code data.

11. An image processing method according to claim 25, wherein said resolution converting step converts a run length of the first code data.

12. An image processing method according to claim 11, wherein said converting step is executed in accordance with a recording mode of the receiver.

13. An image processing method according to claim 12, whererein said resolution converting step thins line data of the first code data.

* * * * *

UNITED STATES PATENT AND TRADEMARK OFFICE
CERTIFICATE OF CORRECTION

PATENT NO. : 4,796,092
DATED : January 3, 1989
INVENTOR(S) : YUKIHIKO OGATA

Page 1 of 2

It is certified that error appears in the above-identified patent and that said Letters Patent is hereby corrected as shown below:

COLUMN 1

Line 20, "read)" should read --Read)--.
    Line 23, "and" should be deleted.
    Line 33, "read)" should read --Read)--.

COLUMN 2

Line 34, "DESCRPTION" should read --DESCRIPTION--.

COLUMN 3

Line 3, "record" should read --recorded--.

COLUMN 4

Line 18, "ROM (Random Access Memory)" should read --RAM (Random Access Memory)--.
    Line 43, "if" should read --is--.

COLUMNS 5 AND 6

Claims 4-9 should be deleted.

UNITED STATES PATENT AND TRADEMARK OFFICE
CERTIFICATE OF CORRECTION

PATENT NO. : 4,796,092
DATED : January 3, 1989
INVENTOR(S) : YUKIHIKO OGATA

Page 2 of 2

It is certified that error appears in the above-identified patent and that said Letters Patent is hereby corrected as shown below:

COLUMN 6

Line 37, "conerted" should read --converted--.
Line 40, "25," should read --10,--.
Line 46, "whererein" should read --wherein--.

Signed and Sealed this

Twenty-fourth Day of October, 1989

Attest:

DONALD J. QUIGG

Attesting Officer

Commissioner of Patents and Trademarks